United States Patent [19]

Monari

[11] 4,218,688

[45] Aug. 19, 1980

[54] DEFORMOGRAPHIC STORAGE DISPLAY SYSTEM

[75] Inventor: Lawrence M. Monari, North Indialantic, Fla.

[73] Assignee: Harris Corporation, Cleveland, Ohio

[21] Appl. No.: 865,726

[22] Filed: Dec. 29, 1977

[51] Int. Cl.[2] .............................................. G11B 9/00

[52] U.S. Cl. .................................... 346/74.1; 360/59; 365/126

[58] Field of Search .................. 360/59; 365/126, 127, 365/234; 346/74.1

[56] References Cited

U.S. PATENT DOCUMENTS

| | | | |
|---|---|---|---|
| 2,915,594 | 12/1959 | Burns | 360/59 |
| 3,281,798 | 10/1966 | Glenn | 365/126 |
| 3,385,927 | 5/1978 | Hamann | 365/126 |
| 3,436,216 | 4/1969 | Urbach | 365/126 |
| 3,612,665 | 10/1971 | Vassiliou | 346/74.1 |
| 3,781,905 | 12/1973 | Bernal et al. | 360/59 |
| 3,832,528 | 8/1974 | Abe | 365/127 |
| 3,838,402 | 9/1974 | Gracie | 365/127 |
| 4,032,923 | 6/1977 | Pond | 360/59 |

OTHER PUBLICATIONS

*Laser Readout for Magnetic Film Memory*, Kump et al., IBM Tech. Discl. Bull. vol. 8, No. 9, 2/66, p. 1244.

*Primary Examiner*—John H. Wolff

*Attorney, Agent, or Firm*—Craig & Antonelli

[57] ABSTRACT

A multiple display system for the display of electronically processed data includes a deformographic storage tube in which a deformographically created image pattern is generated. High intensity projection light is directed at the deformographic storage tube and a plurality of separate images of the pattern are displayed by a controlled scanning arrangement. One of the images may be projected upon a thermomagnetic recording medium so as to induce in the thermomagnetic sensitive medium a retained pattern corresponding to the deformographically created image pattern. From the thermomagnetic recording medium, the retained pattern may be transferred to a further recording medium such as through a magnetoxerography process.

26 Claims, 10 Drawing Figures

AXIS L - MIRROR ROTATION AXIS
THERMOMAGNETIC RECORDING MEDIUM (IMAGE PLANE)
60
ARC LAMP
20
22
CONDENSING LENS
23
SHUTTER
55
TERMINAL VIEWING SCREEN
P
37
38
36
SHUTTER
34
TYPESETTER FILM PLANE
25
24
APERTURE STOP
MIRROR
29
28
27
PROJECTION LENS
SCHLIEREN LENS
26
21
DEFORMOGRAPHIC IMAGE
11
FACEPLATE
17
10
DEFORMOGRAPHIC STORAGE TUBE
ALUMINUM COATING 12
SILICON POLYMER 13
MICA 14
15
ELECTRONIC INFORMATION
16

DEFORMOGRAPHIC STORAGE DISPLAY SYSTEM

FIELD OF THE INVENTION

The present invention relates to a display system, particularly one employing a deformographic storage device, such as a deformographic storage tube.

BACKGROUND OF THE INVENTION

The continuing advance in data processing systems has been accompanied by the need for terminal display and recording systems which make optimum use of a data processor's data handling capabilities. Typical video read-out facilities involve the use of a cathode ray tube display, wherein image signal processing results in a pictorial display on the face of the CRT. In addition to such a primary recording medium, secondary storage apparatus, such as video copying devices, may be used in conjunction with the display on the CRT, so that the image electronically projected on the CRT screen may be retained on a secondary storage medium.

One such system for so recording electronicaly processed and video stored data is described in U.S. Pat. No. 3,457,371 to A. U. Sharon. The graphic display system described therein employs a CRT for graphically displaying computer-processed information, such as a two-dimensional data plot. Optically coupled to the CRT screen, and external to the tube, is a xerographic recording apparatus, by way of which information from the data processing system displayed on the CRT during real time is recorded on a xerographic plate by a PROXI (projection by reflection optics of xerographic images) process. The image retained on the xerographic plate may be viewed by an optical system separate from that permitting direct viewing of an image on the face of the CRT. A further display may be initiated and its image retained by erasing the xerographic plate and subsequently recording the new CRT image on the plate.

Although an auxiliary image storage system of the type described in the patent to Sharon permits retention of a video processed image on a medium other than the CRT screen, the field of view is limited and multiple projection and recordation is not provided. Furthermore, the relatively low light intensity available from the screen of a cathode ray tube is not sufficient to permit satisfactory large scale image projection, particularly under normal ambient lighting conditions.

A specialized cathode ray tube storage and transfer system of the type wherein electronically processed information may be recorded on a magnetic tape by way of the CRT is described in the U.S. Pat. No. 3,689,934 to Nacci. The cathode ray tube has a particular thermomagnetic sensitive structure so that a thermomagnetic image is created on the face plate, with the selective magnetizations then being used to transfer the image to a magnetic tape, a line at a time. While the system described in this patent derives a magnetically transferrable image from a modulated cathode ray, the pattern stored on the tube is limited, not widely and multiply displayed, and information is transferred by a line-at-a-time magnetic tape mechanism which must be positioned immediately adjacent the face of the tube, preventing direct display of the recorded pattern.

Projection of the information pattern created on the surface of a deformographic type storage tube is described in U.S. Pat. No. 3,385,927 to Hamann and U.S. Pat. No. 3,902,012 to Dalton et al. However, the singular type of display described therein is akin to the basic CRT display provided by the system described in the Sharon patent. Multiple and separate imaging and/or recording of the deformographically stored pattern are not provided.

SUMMARY OF THE INVENTION

In accordance with the present invention, there is provided a display system wherein large scale multiple displays of video processed information are made available through the use of a deformographic storage tube and a multiple image projection viewing and storage arrangement. In accordance with one embodiment of the invention, information to be displayed is temporarily recorded on a deformable recording medium as contained within a deformographic storage tube. A high intensity light beam is projected onto the tube, the recording medium of which has been deformed in accordance with the image-representative information to be displayed. Light reflected off the deformed medium passes through a projection/filtering lens system to be projected upon a multiple imaging or display arrangement, whereas light reflected from a non-deformed portion of the recording medium of the deformographic storage tube is intercepted by a suitable stop. The multiple imaging arrangement may include a large scale viewing screen, disposed on the axis of the projection/filtering lens system, and one or more separate imaging planes, disposed off the axis of the projection/filtering lens system on which the image projected from the deformographic storage tube is sequentially and selectively directed by a scanning/shutter system.

In another embodiment of the invention, each component of the multiple imaging arrangement may be separately positioned off axis and separately illuminated. Where the system is employed for imaging data obtained from electronic word processing, as carried out in word/graphic composition systems, separate image planes, such as for editor/composer viewing, proofing, typesetting, and printing plates may be provided.

In further embodiments of the invention, simultaneous viewing of the image stored on the deformographic storage tube and separately illuminating the auxiliary off-axis image planes can be effected by use of a dichroic scanning mirror or multiple projection systems. In the latter embodiment, separate light sources and projection systems are used for the simultaneous viewing and multiple separate projection of the information stored in the deformographic storage tube. An especially advantageous modification of the above systems involves the incorporation of projection overlay imaging systems whereby an image, separate from that derived by way of the deformographic storage tube, is projected onto each multiple display medium receiving the light reflected off the deformographic storage tube, thereby creating a compound image on each display plane.

In order to permit retention of the image obtained from the deformographic storage tube, a thermomagnetic recording medium may be disposed at an image plane of the multiple projection optics arrangement. Preferably, the thermomagnetic recording medium is in the form of a thermomagnetic recording and reproducing apparatus wherein the image to be recorded is directed upon a thermomagnetic recording drum, which has been magnetically precharged so that a latent image of the information derived from the deformographic storage tube may be formed on the surface of the drum. As the drum rotates, toner is selectively attracted to the surface of the drum in accordance with the recorded image, thereby permitting transfer of the image to a reproduction medium, such as paper.

DETAILED DESCRIPTION

Figure 1:
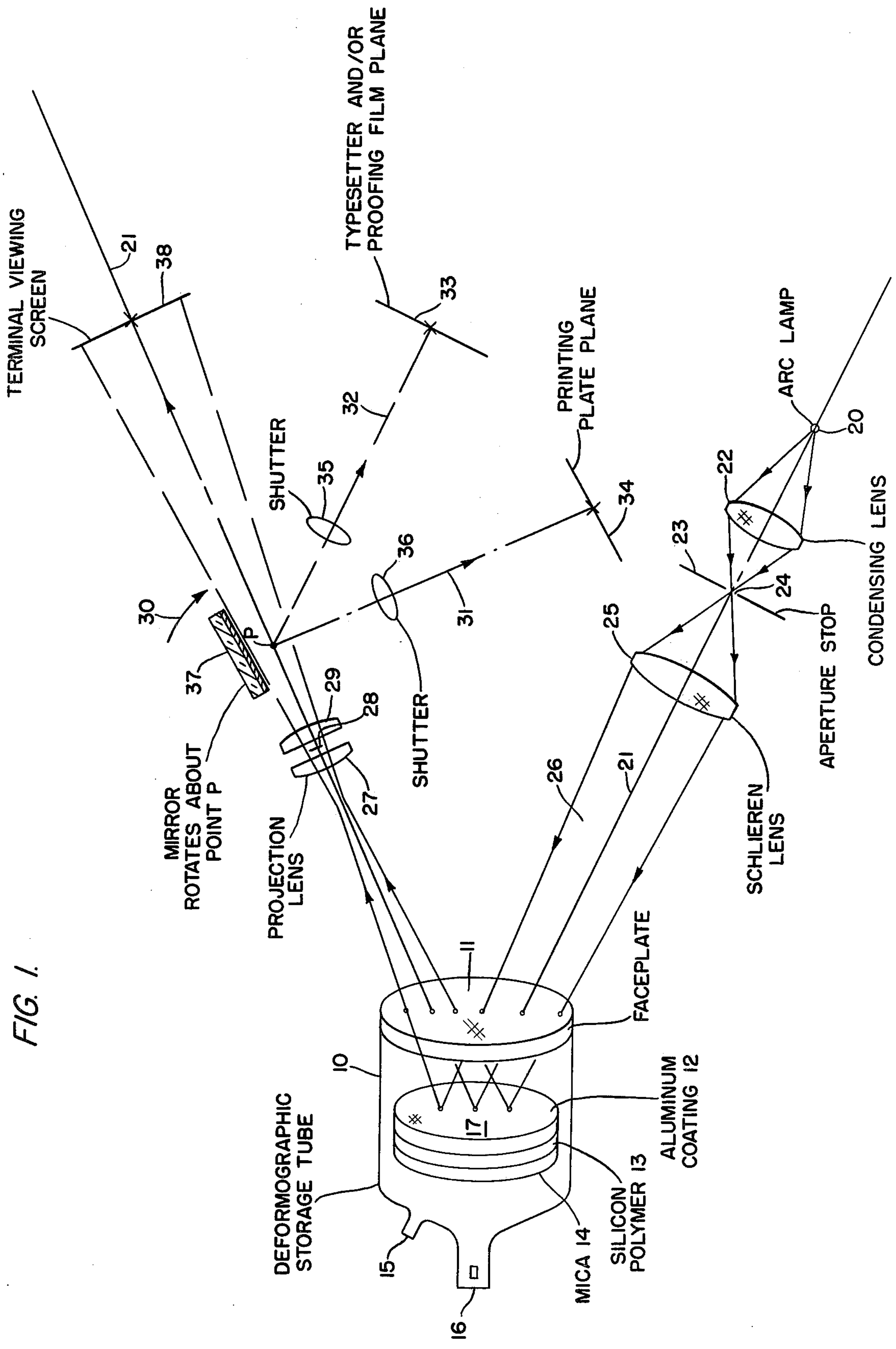
FIGS. 1 through 4 are pictorial diagrams of a deformographic storage display system employing a single imaging light source for a multiple image projection arrangement.

Referring now to FIG. 1, wherein an embodiment of the present invention is diagrammatically illustrated, there are shown a deformographic storage tube 10, 11 which may be of the type described in U.S. Pat. No. 3,858,080 to Wohl. For purposes of a concise description of the invention, only a simplified illustration of such a deformographic storage tube is shown in the drawings, and reference may be had to the above patent for a more detailed explanation of the structure and operation of the storage tube, per se. Basic components of the storage tube are a glass envelope including face plate 11, separated by a vacuum formed deformographic storage laminated medium made up of a mica layer 14, a silicon polymer layer 13, and a coating of aluminum 12, facing the glass face plate 11. Between layer 13 and aluminum layer 12, there is further provided a thin barrier layer, not shown, as described in the above-referred to patent to Wohl. An information writing electron beam is emitted from high resolution electron gun 16 and, via appropriate deflection coils, not shown, causes a charge pattern to be created on mica layer 14 as the electron beam scans the deformographic storage laminate. Areas of charge on the surface of mica layer 14 cause distortion of the surface of silicon polymer layer 13 facing the aluminum layer 12, whereby depressions, or dimples, are created in the surface of aluminum layer 12 facing face plate 11 representative of information modulating the electron beam scanned across the laminate. The distorted configuration of the surface of aluminum layer 12 will be retained until removed by an erasure electron beam from erase flood gun 15.

In order to read-out the depression, or dimple, pattern created on the surface of aluminum coating layer 12, a high intensity read-out light beam 26 is directed upon the face plate 11 of tube 10. The read-out beam 26 is generated by a high intensity arc lamp 20, such as an xenon arc lamp. Rays from lamp 20 are converged by a condensing lens 22 through an aperture stop plate 23 having a small aperture 24 on the axis of lens 22 coincident with read-out beam axis 21. The image of arc lamp 20 at the aperture 24 of aperture stop 23 is then projected by Schlieren lens 25 as beam 26 onto the face plate 11 of deformographic storage tube 10. Beam 26 is refracted by face plate 11 and impinges upon the surface 17 of aluminum layer 12. Beam 26 then reflects off the distorted and non-distorted areas of surface 17 to be again refracted by glass face plate 11 towards projection lenses 27 and 29. Schlieren lens 25 is positioned relative to the surface 17 of aluminum coating 12 so that where surface 17 is perfectly flat, the entire image of aperture 24 will be focussed at an opaque stop 28. However, wherever the surface 17 is distorted due to an information-representative charge pattern on mica layer 14, the light ray impinging upon, and reflected from, the depression, or dimple, in surface 17 will be displaced away from opaque stop 28 and be projected by lenses 27 and 29 onto a selected image plane.

At one of these image planes, disposed normal to beam axis 21, is a terminal viewing screen 38 upon which an enlarged optical representation of the distortion pattern on the surface 17 of aluminum coating 12 may be projected by lenses 27 and 29. Other image planes are plane 33, at which a typesetter and/or proofing film may be disposed, and image plane 34, at which there may be positioned a suitable printing plate, where the system of FIG. 1 is to be used for word/graphics composition, for example. Selective imaging of screen 38 and planes 33 and 34 is effected by a scanning mirror 37, rotatable about point P by a suitable support and rotational drive mechanism, an illustration of which has been omitted from the drawing to avoid complicating the general optics diagram.

When mirror 37 is in the position shown, it is completely out of the path of beam 26 so that only viewing screen 38 receives an image of the surface 17 of the deformographic laminate. Mirror 30 may be rotated clockwise about point P so that the image projected by lens 29 may be directed along axis 32 which is normal to image plane 33. A suitable shutter 35 is disposed on axis 32 to prevent the projection of light on image plane 33 except when the axis of the projected image beam is normal to image plane 33. Similarly, further rotation of mirror 37 about point P in the direction of arrow 30 will bring the axis of the projected image beam into alignment with the normal 31 to image plane 34, so that a further shutter 36 may be opened to permit an image of the deformed surface 17 to be projected on image plane 34. Of course, shutters 35 and 36, as well as plates 33 and 34, may be provided in separated housing arrangements to prevent the entry of ambient light, and to permit imaging of the information pattern on surface 17 of tube 10 only when mirror 37 is properly positioned and a respective one of shutters 35 and 36 is opened. Again, for the purpose of simplifying the pictorial illustration of the optics arrangement, these light confining housings are not depicted.

Figure 2:
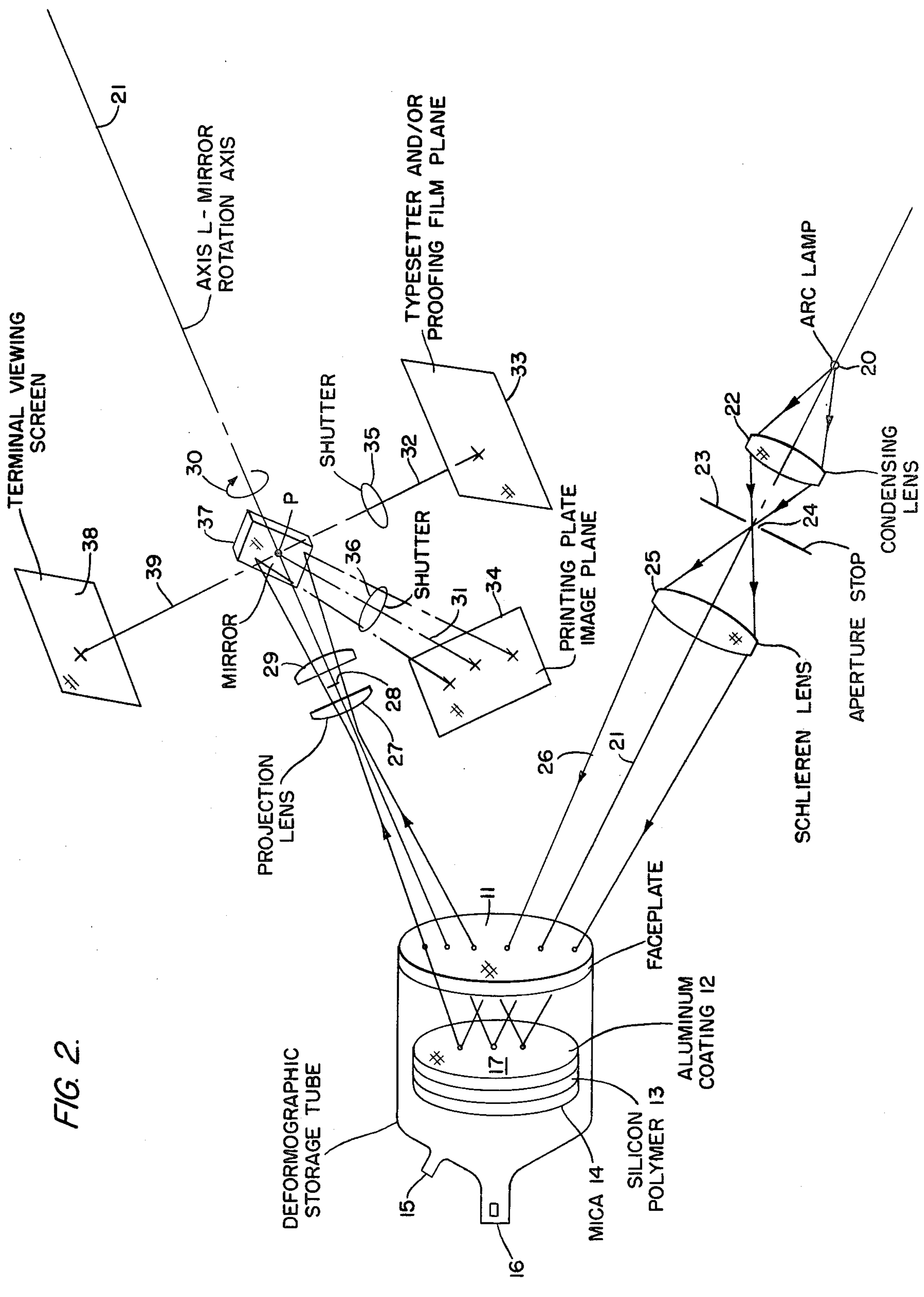

In the embodiment of the invention shown in FIG. 1, viewing screen 38 is positioned normal to the axis 21 of the projection lens system 27 - 29 in which the rotational axis P of scanning mirror 27 is located. However, terminal view screen 38 may be positioned off the axis 21 as shown in FIG. 2, so that the image of the pattern on surface 17 is deflected by mirror 37 along the normal 39 to screen 38. The axis of rotation of mirror 37 is coincident with the beam axis 21, with image planes 33, 34, and 38 positioned about axis 21 in an annular or circularly shaped configuration, to be sequentially scanned as mirror 37 rotates in the direction of arrow 30. In addition, separate image planes may be provided for typesetter and proofing films, as shown in FIG. 3.

Specifically, typesetter film plane 33*a* and proofing film plane 33*b* are disposed along an imaginary annular or circular ring disposed about axis 21, so as to be illuminated in sequence as mirror 37 rotates about point P. Separate shutters 35*a* and 35*b* are provided to expose the typesetter film and the proofing film as the projection beam axis coincides with respective image plane normals 32*a* and 32*b*, respectively.

Figure 3:
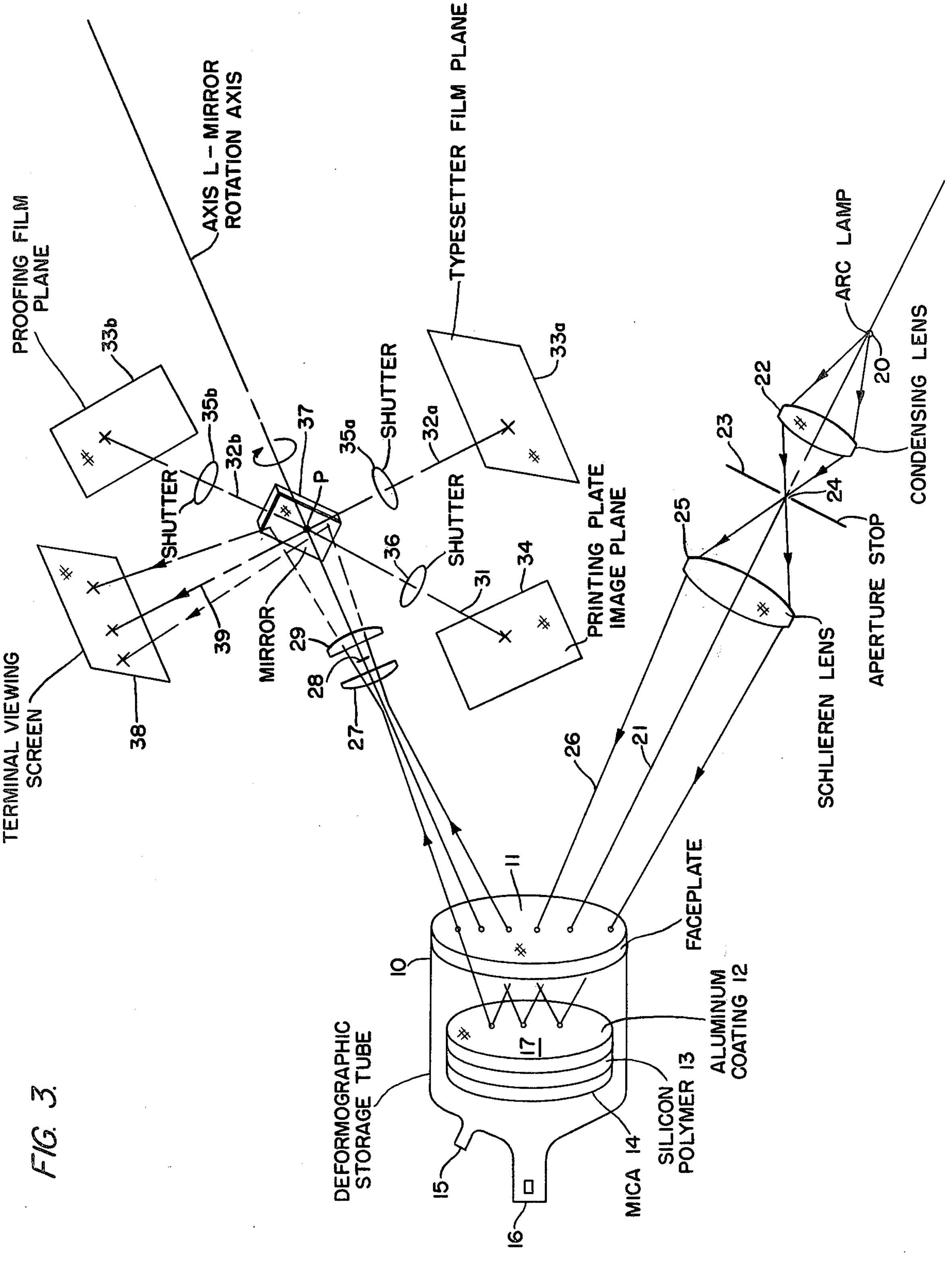
Figure 4:
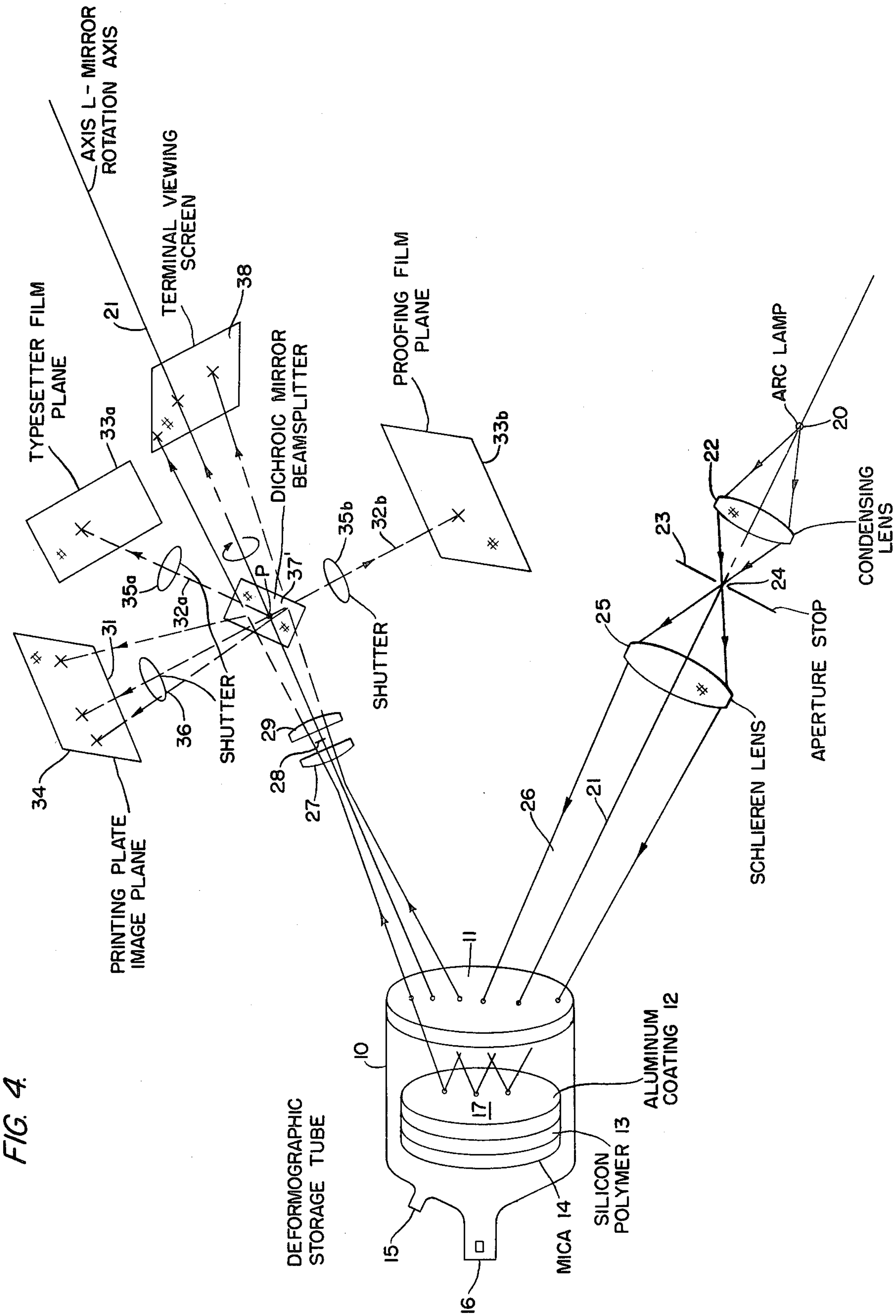

In each of the embodiments shown in FIGS. 1 through 3, when the information pattern on the surface 17 of deformographic storage tube 10 is projected on one of the image planes, other than the terminal viewing screen, it is projected only upon that one image plane and is not simultaneously observable on screen 38 because of the position of scanning mirror 37. However, interruption of the projection of the information image on screen 38 may be avoided so that continuous observation of the projected image may take place by employing a dichroic mirror beam splitter for the scanning mirror. In such a case, terminal viewing screen 38 may be positioned on axis 21, as shown in FIG. 4, with a dichroic mirror beam spliter 37' rotating about point P to sequentially scan proofing film plane 38*b*, typesetter film plane 33*a*, and printing plate image plane 34, while continuously projecting the image pattern on terminal viewing screen 38.

Figure 5:
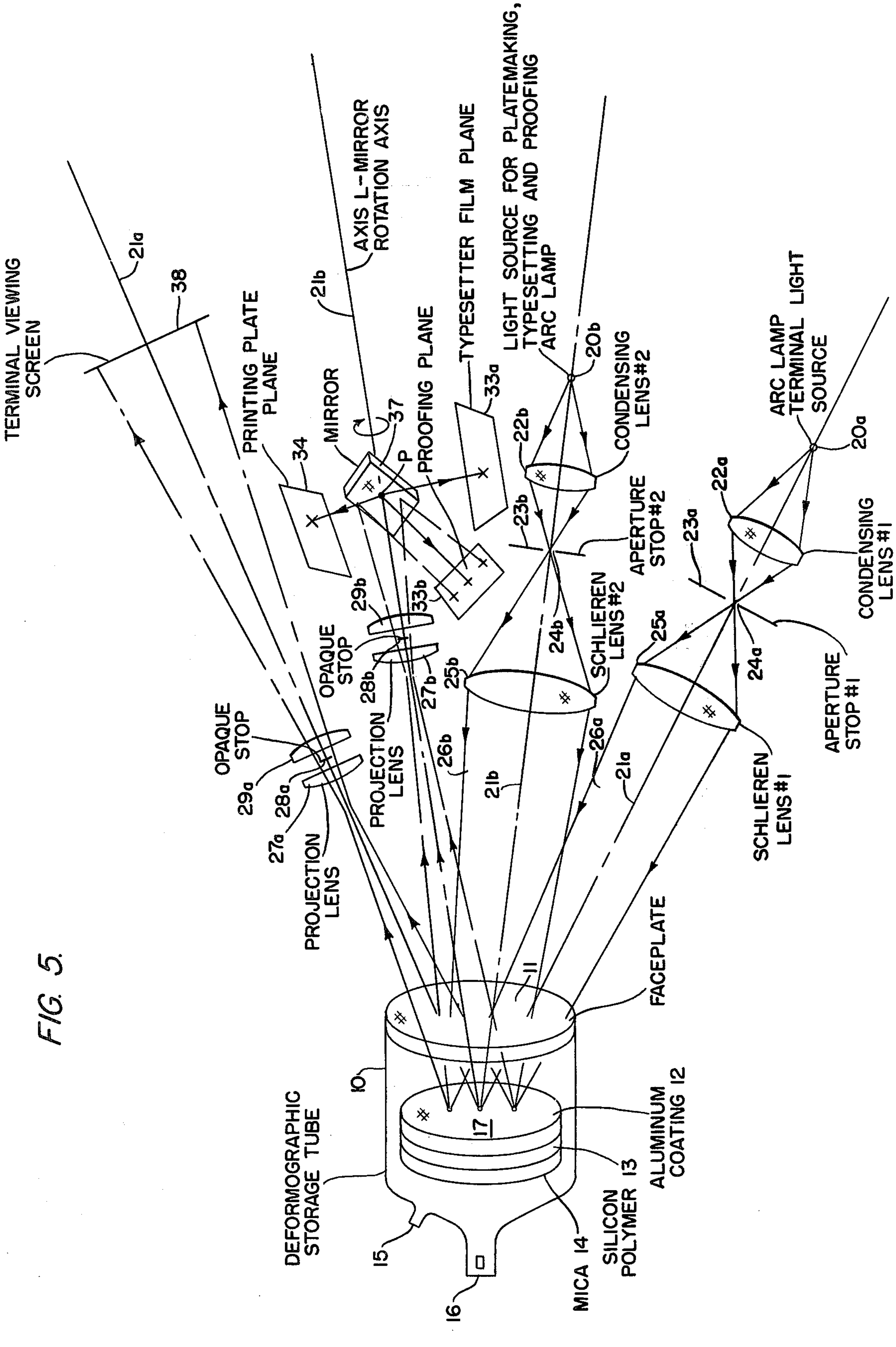
FIGS. 5 and 6 are pictorial diagrams of a deformographic storage display system employing separate imaging light sources for viewing and multiple image projection.

Continuous projection of the information pattern on surface 17 of tube 10 while permitting sequential scanning of the proofing, typesetter, and printing plate image planes may also be carried out with the embodiment of the invention depicted in FIG. 5. As shown therein, separate illumination systems are provided for the terminal viewing screen and the separate recordation image planes. In this configuration, increased light intensity is available for the terminal viewing screen 38 so that the projected image is clearly viewable under ambient lighting conditions. The separate illumination beam for image recording planes 33*a*, 33*b*, and 34 permits physical separation and optical confinement of readout beam 26*b* to minimize the influence of ambient light.

For direct continuous observation of the information pattern, a first arc lamp 20*a*, with associated condensing lens 22*a*, aperture stop 23*a*, and Schlieren lens 25*a* provide a first read-out beam 26*a*, directed along a first axis 21*a*. A first projection lens arrangement comprising lenses 27*a* and 29*a*, together with opaque stop 28*a*, project the deformographically produced information pattern on surface 17 of tube 10 to terminal viewing screen 38. A second read-out light source for platemaking, typesetting, and proofing is provided by arc lamp 20*b*, light from which is focussed by condensing lens 22*b* at aperture 24*b* of stop 23*b*. The image of the second arc lamp is projected by Schlieren lens 25*b* onto face plate 11 of tube 10 at an angle different from the angle of incidence of beam 26*a*, so that projection lenses 27*b* and 29*b*, together with opaque stop 28*b* are offset along axis 21*b* relative to beam axis 21*a*. Scanning mirror 37 is positioned to rotate about point P on axis 21*b* and thereby sequentially illuminate recordation image planes 33*a*, 33*b*, and 34, so that separate projections and recording of the information pattern in surface 17 of deformographic storage tube 10 may be carried out without interrupting or decreasing the intensity of the image projected upon terminal viewing screen 38.

Figure 6:
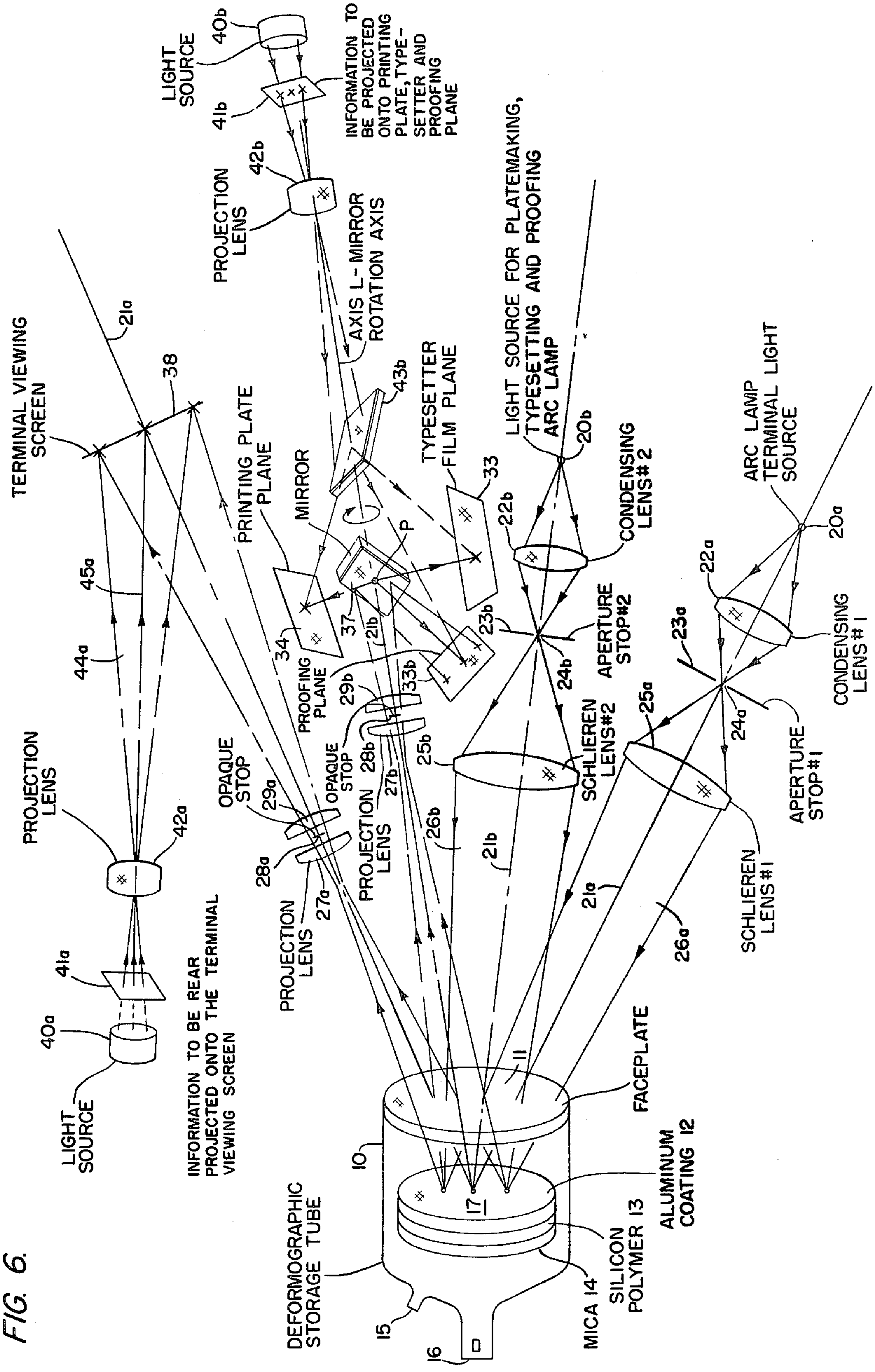
Figure 7:
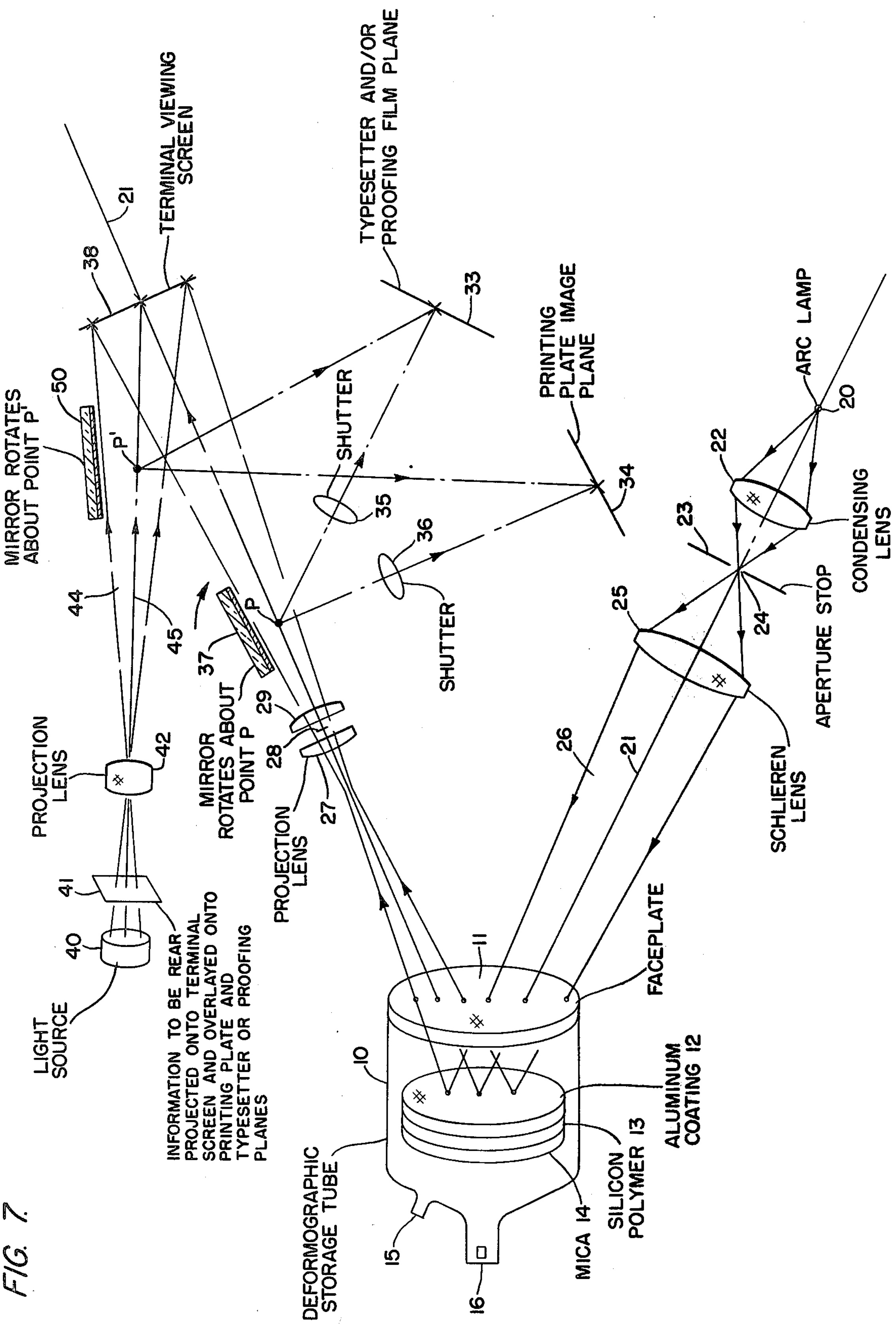
FIGS. 7 and 8 are pictorial diagrams of deformographic storage display systems as shown in FIGS. 1 and 2, incorporating secondary image overlay projection systems.
Figure 8:
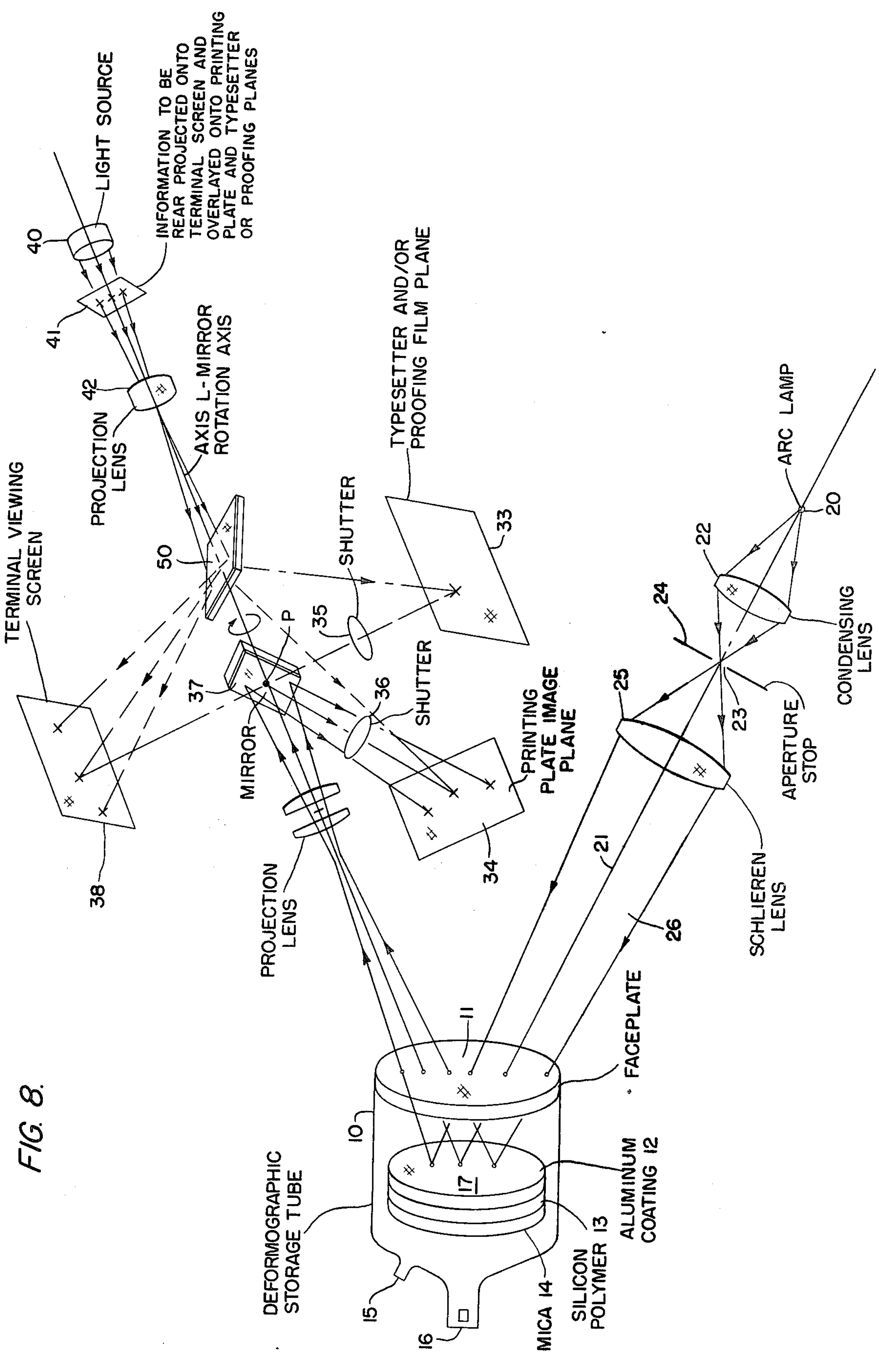

FIGS. 6, 7, and 8 illustrate modifications of the embodiments of the invention described above in connection with FIGS. 5, 1, and 2, respectively, whereby information provided, independent of that pesented on the deformographic storage tube, may be projected on the terminal viewing screen and the recordation image planes to overlie that obtained from storage tube 10. For this purpose, as shown in FIG. 6, a light source 40*a* directs an overlay beam of light 44*a* through a transparency 41*a* containing the information to be projected onto viewing screen 38 to overlay that read out from tube 10 by beam 26*a*. Projection lens 42*a* directs the image supplied by transparency 41*a* onto screen 38 to create a compound image with the information pattern image obtained from deformographic storage tube 10. For projecting an information overlay on image recording planes 33*a*, 33*b*, and 34, there may be provided a further light source 40*b*, transparency 41*b*, projection lens 42*b*, and further scanning mirror 43*b*. Mirror 43*b* rotates in synchronism with mirror 37 to sequentially direct the overlay information from transparency 41*b* onto image planes 33*a*, 33*b*, and 34, as the information pattern from deformographic storage tube is sequentially projected upon the image planes by virtue of mirror 37.

In the embodiment shown in FIG. 7, wherein a single read out beam is used as in the embodiment shown in FIG. 1, there is provided a single overlay projection light source 40 which illuminates transparency with projection lens 42 projecting the overlay image beam 44 from transparency 41 as along axis 45 to terminal display screen 38. A second mirror 50 rotates about point P', positioned on axis 45, in synchronism with the rotation of mirror 37, to effect a sequential illumination of screen 38, image plane 33 and image plane 34, so that the compound image made up of both the information pattern from the deformograhic storage tube and the overlay pattern will be sequentially projected upon each image plane.

In the embodiment shown in FIG. 8, an overlay image is projected upon the image planes arranged as in the embodiment described previously with reference to FIG. 2. In the present embodiment, image overlay light source 40, transparency 41, and projection lens 42 are disposed so that their optical axis coincides with axis 21. Similarly, mirror 50 rotates about an axis intersecting axis 21, as does point P, and in synchronism with mirror 37, to effect simultaneous scanning by mirrors 37 and 50 of each image plane in sequence.

Figure 9:
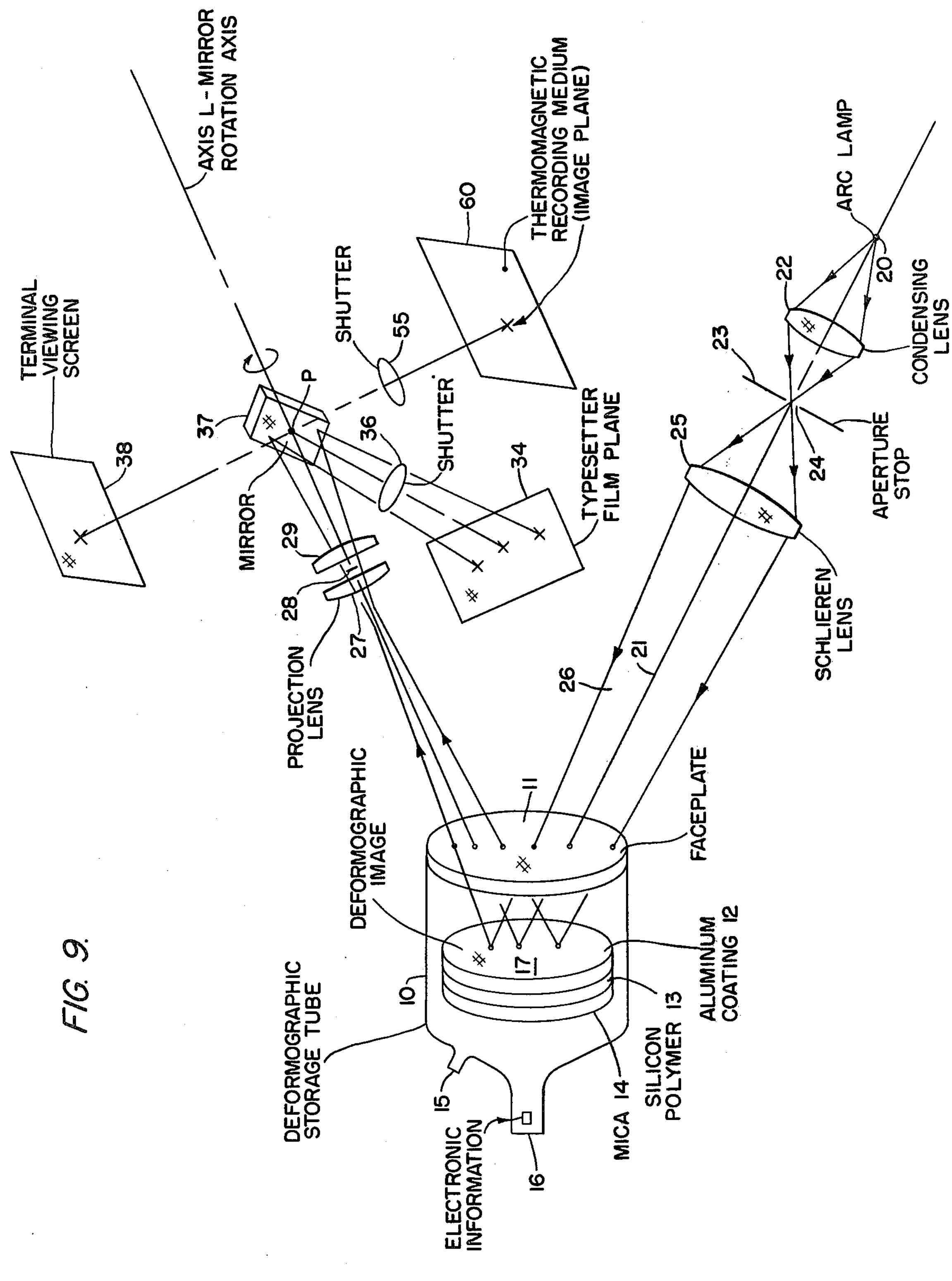
FIG. 9 is a pictorial diagram of a deformographic storage display system as shown in FIG. 2, employing a thermomagnetic recording medium.
Figure 10:
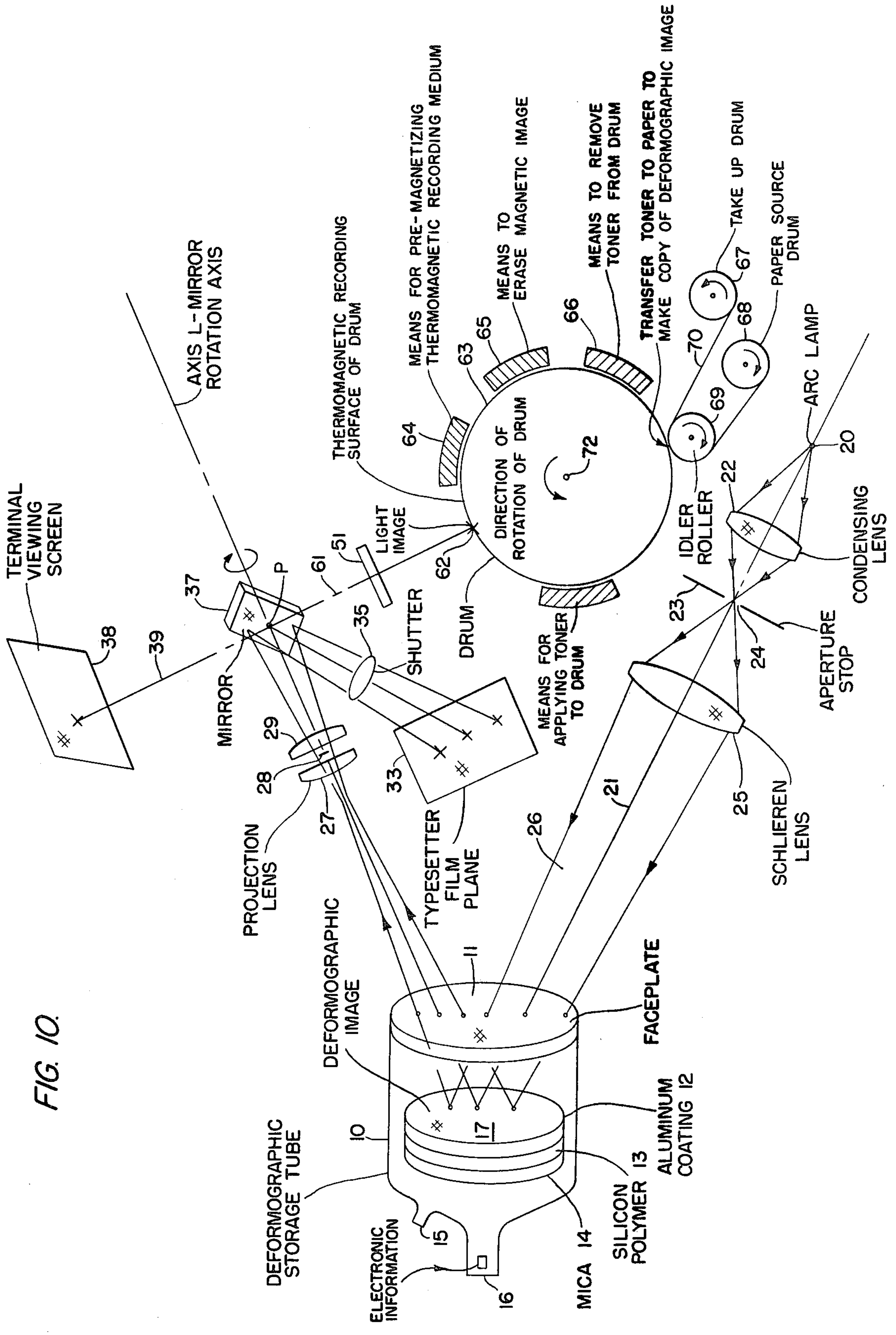
FIG. 10 is a pictorial diagram of a deformographic storage display system employing a thermomagnetic recording and producing system.

FIGS. 9 and 10 illustrate embodiments of the invention, wherein a thermomagnetic recording medium is disposed in one of the image planes disposed as in the embodiment illustrated in FIG. 2, described previously. In FIG. 9, there is shown a thermomagnetic recording medium which may be used in the plane of the typesetter and/or proofing film plane 33. Thermomagnetic recording medium 60 may be in the form of a flat plate as diagrammatically illustrated in FIG. 9, or a non-planar surface, such as a recording drum as shown in FIG. 10. The components associated with the thermomagnetic plate 60, for pre-magnifying, temperature biasing, and erasure, have not been illustrated in FIG. 9, in order to simplify the drawing. An exemplary description of a thermomagnetic recording plate and associated magnifying and biasing components may be found in U.S. Pat. No. 3,555,556 to Nacci. Thus, thermomagnetic plate 60 may be composed of a magnetic material such as chrominum dioxide secured to the surface of a transparent support member. The read-out beam 26 from arc lamp 20, modulated by surface 17 of tube 10, is projected as a light image onto the surface of plate 60 and the information pattern image is absorbed by plate 60, previously premagnetized to create a magnetic image on plate 60, as explained in U.S. Pat. No. 3,555,556. The magnetic image is permanent and may be read out by suitable artifice, such as magnetic ink, toner, etc.

A more detailed illustration of an especially useful embodiment of the invention, wherein a thermomagnetic recording medium is employed, is shown in FIG. 10.

In the embodiment of the invention shown in FIG. 10, the thermomagnetic recording medium, shown as a plate 60 in FIG. 9, is configured as a drum 63 on the surface of which is provided a thermomagnetic sensitive material. An exemplary illustration and description of a drum-configured thermomagnetic recording apparatus may be found in U.S. Pat. No. 3,787,877 to Nacci et al, wherein there is disclosed a magnetic copying apparatus for transferring magnetically recorded images to a further recording medium, such as paper. Also, although the patent to Nacci et al, No. 3,555,556, referred to in connection with FIG. 9, describes the configuration of the thermomagnetic recording medium in the form of a plate, to receive a substantially planar image from the document being copied, the thermomagnetic recording technique, per se, described there, may be applied to a non-planar medium, such as a cylindrical drum, as described in the U.S. Patent to Nacci, No. 3,787,887, with appropriate image distortion correction measures taken to counter the effect of the nonlinearly shaped surface of the cylindrical drum. More specifically, in the embodiment shown in FIG. 1 of U.S. Pat. No. 3,787,877, magnetizing means 17 is configured to be curvilinear along the surface of the thermomagnetic recording drum. Where the image from a planar, or flat, surface is projected upon a cylindrical surface, there may be required a corrective measure to eliminate or minimize distortion of the image on the surface of the drum. In the embodiment of the present invention shown in FIG. 10, a distortion corrective lens 51 may be inserted in the projection optical path between mirror 37 and the surface of drum 63. Alternatively, the diameter of drum 63 may be made large enough, relative to the size of the image projected by lenses 27, 29 and reflected by mirror 37, so that the surface area 62 of the drum receiving the image is substantially flat. Adjustment of the optical projection system and/or drum diameter will be governed by the image precision requirements of the user. Where slight image distortions can be accommodated, the incorporation of a correction lens may not be necessary. The thermomagnetic recording arrangement itself includes the drum 63, which is driven by a suitable rotational drive mechanism (not shown) counterclockwise about axis 72, as viewed in FIG. 10. Disposed adjacent to the periphery of drum 63 is a premagnetizing element 64, such as a retractable permanent magnet or d.c. electromagnet which, when placed in operation, magnetizes the magnetic material of the thermomagnetic sensitive surface of drum 63. If necessary, an appropriate temperature bias source, such as a suitable heating lamp, positioned adjacent premagnetizing head 64 or located within the drum 63 itself, may be provided. For an exemplary disclosure of a suitable temperature bias source, reference may be had to U.S. Patents to Nacci; Nos. 3,555,556 and 3,698,005; which describe the internal positioning of flash lamps that, in addition to supplying readout light for a document being recorded, are used to cause the temperature of the thermomagnetic medium to the appropriate bias temperature. A suitable erase head 65 is disposed clockwise of element 64 to controllably erase any magnetic image stored on drum 63, so that a new image may be recorded. Light from mirror 37 passes through corrective optics 51, impinges at surface area 62 and thermomagnetically induces an image corresponding to the deformographic pattern on surface 17 of tube 10 in the sensitive recording surface of the drum 63. The magnetic image stored on drum 63 then passes a magnetic toner applying element 71, such as that described in the above-referred to U.S. patent to Nacci et al No. 3,698,005. After the removal of excess toner, by a suitable air knife, for example, as described in the Nacci 3,698,005 patent, the toner power image is conveyed to an image transfer mechanism including a paper supply drum 68, resilient pressure roller 69, and take-up drum 67. Drum 68 and roller 69 may rotate in a clockwise direction, as viewed in FIG. 10, while take-up drum 67 may rotate in a clockwise direction. Transfer of the toner image on drum 63 to paper 70 takes place as the paper 70 travels over roller 69 as it is brought into contact with the surface of drum 63. After one complete copy of the image pattern stored in drum 63 has been transferred to paper 70, a suitable toner remover mechanism 66, such as rotary bristle brush, may remove any toner particles not transferred to paper 70, so as to effectively clean the surface of the drum. The image pattern may be erased by erase head 65 to prepare the drum to receive a new thermomagnetically induced image or, where multiple copies of the same deformographic image pattern are desired, mirror 37 may be rotated away from the drum 63, while elements 64 and 65 remain deactivated. A previously thermomagnetically recorded image is thereby retained on drum 63 so that multiple prints or copies of the image may be recorded on paper 70 as the drum continues to rotate and the toner is again applied for transfer of another image.

As will be appreciated from the foregoing description of the various embodiments of the present invention, large scale and multiple imaging of electronically processed information is made possible by the use of a deformographic storage and readout system, wherein the deformographically stored pattern is imaged in multiple planes or to multiple recording facilities. One of the facilities may include a thermomagnetic recording and reproducing medium, so that the image pattern formed on the deformographic storage tube, may be optically displayed for further processing and then permanently recorded and reproduced.

While I have shown and described several embodiments in accordance with the present invention, it is understood that the same is not limited thereto, but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. In a data display system having a deformographic storage device upon which light for forming a display image of a deformographically created pattern is directed, the improvement comprising:

a thermomagnetic recording medium; and means for reflecting light reflected from said deformographic display device onto said thermomagnetic recording medium and thereby inducing therein a thermomagnetically created image pattern corresponding to said deformographically created pattern.

2. The improvement according to claim 1, further comprising means, coupled to said thermomagnetic recording medium, for transferring the thermomagnetically created image pattern therein to a further recording medium.

3. The improvement according to claim 2, wherein said thermomagnetic recording medium comprises a thermomagnetic recording drum.

4. The improvement according to claim 3, wherein said further recording medium is a medium for permanently retaining the image transferred thereto.

5. The improvement according to claim 1, wherein said light is directed upon the entirety of said deformographically-created pattern and said reflecting means reflects light from the entirety of said pattern onto said thermomagnetic recording medium.

6. In a data display system having a deformographic storage device upon which light for forming a display image of a deformographically-created pattern is directed, the improvement comprising:

first means for directing a first beam of light upon said deformographically-created pattern, whereby an image-containing output beam reflected from said deformographic storage device is obtained;

second means for reflecting said image-containing output beam onto a plurality of separate image planes; and third means, disposed at one of said image planes, for thermomagnetically recording the image of said deformographically-created pattern reflected thereon.

7. The improvement according to claim 6, wherein said second means comprises means for selectively reflecting said image-containing output beam sequentially onto said plurality of separate image planes.

8. The improvement according to claim 7, wherein each of said image planes is disposed so as to be displaced off the axis of said output beam.

9. The improvement according to claim 6, wherein said first means comprises means for causing rays of light of which said first beam is comprised to impinge upon a first prescribed imaging area when said rays are reflected off non-deformed portions of said deformographic storage device, and for causing rays of light of which said first beam is comprised to be projected away from said first prescribed imaging area when said rays are reflected off deformed portions of said deformographic storage device.

10. The improvement according to claim 6, wherein said second means includes means for controllably exposing selected ones of said image planes to said image-containing output beam during the sequential reflection thereof onto said plurality of separate image planes.

11. The improvement according to claim 6, wherein said first means comprises means for directing said first beam of light upon the entirety of said deformographically-created pattern.

12. The improvement according to claim 11, wherein said thermomagnetic recording means comprises a thermomagnetic recording drum, positioned to have its thermomagnetic sensitive surface positioned to pass within said one of said image planes.

13. The improvement according to claim 12, wherein said thermomagnetic recording means further comprises means, coupled to said thermomagnetic recording drum, for transferring the image of said deformographically-created pattern, reflected upon and thermomagnetically recorded on the thermomagnetic sensitive surface of said drum, onto a further recording medium.

14. The improvement according to claim 6, wherein said thermomagnetic recording means comprises means for transferring the thermomagnetically recorded image of said deformographically created pattern to a further recording medium.

15. The improvement according to claim 14, wherein said further recording medium is a medium for permanently retaining the image transferred thereto.

16. The improvement according to claim 6, wherein said thermomagnetic recording means comprises a thermomagnetic recording drum, positioned to have its thermomagnetic sensitive surface positioned to pass within said one of said image planes.

17. The improvement according to claim 16, wherein said thermomagnetic recording means further comprises means, coupled to said thermomagnetic recording drum, for transferring the image of said deformographically created pattern, reflected upon and thermomagnetically recorded on the thermomagnetic sensitive surface of said drum, onto a further recording medium.

18. The improvement according to claim 17, wherein said further recording medium is a medium for permanently retaining the image transferred thereto.

19. In a data display system having a deformographic storage device upon which light for forming a display image of a deformograhically-created pattern is directed, the improvement comprising:

first means for directing a beam of light upon said deformographically-created pattern, whereby an image-containing output beam reflected from said deformographic storage device is obtained; and second means for reflecting said image-containing output beam onto a thermomagnetic recording medium and thereby inducing therein a thermomagnetically-created image pattern corresponding to said deformographically-created pattern.

20. The improvement according to claim 19, wherein said first means comprises means for directing said beam of light upon the entirety of said deformographically-created pattern.

21. The improvement according to claim 19, wherein said first means comprises means for causing rays of light of which said beam is comprised to impinge upon a first prescribed imaging area when said rays are reflected off non-deformed portions of said deformographic storage device and for causing rays of light of which said beam is comprised to be projected away from said first prescribed imaging area when said rays are reflected off deformed portions of said deformographic storage device.

22. The improvement according to claim 19, further comprising means for transferring the thermomagnetically recorded image of said deformographically-created pattern from said thermomagnetic recording medium onto a further recording medium.

23. The improvement according to claim 22, wherein said further recording medium is a medium for permanently retaining the image transferred thereto.

24. The improvement according to claim 19, wherein said thermomagnetic recording medium comprises a thermomagnetic recording drum.

25. The improvement according to claim 24, further comprising means, coupled to said thermomagnetic recording drum, for transferring the image of said deformographically-created pattern, reflected upon and thermomagnetically recorded on the thermomagnetic sensitive surface of said drum, onto a further recording medium.

26. The improvement according to claim 25, wherein said further recording medium is a medium for permanently retaining the image transferred thereto.

* * * * *